United States Patent [19]
Pulford, Jr.

[11] Patent Number: 6,150,789
[45] Date of Patent: Nov. 21, 2000

[54] STEPPER MOTOR CONTROL

[75] Inventor: Robert Pulford, Jr., Wolcott, Conn.

[73] Assignee: Tri-Tech, Inc., Waterbury, Conn.

[21] Appl. No.: 09/323,467

[22] Filed: Jun. 1, 1999

Related U.S. Application Data

[63] Continuation-in-part of application No. 09/250,218, Feb. 13, 1999, abandoned.

[51] Int. Cl.[7] .................................................. G05B 19/40
[52] U.S. Cl. ............................ 318/685; 318/696; 318/686
[58] Field of Search ................................... 318/696, 688, 318/687, 373; 360/70–89

[56] References Cited

U.S. PATENT DOCUMENTS

| | | | |
|---|---|---|---|
| 3,368,128 | 2/1968 | Parrish | 318/138 |
| 3,424,961 | 1/1969 | Leenhouts | 318/138 |
| 3,444,447 | 5/1969 | Newell | 318/138 |
| 3,452,263 | 6/1969 | Newell | 318/138 |
| 3,505,579 | 4/1970 | Leenhouts | 318/138 |
| 3,662,245 | 5/1972 | Newell | 318/696 |
| 3,665,284 | 5/1972 | Loyzim | 318/696 |
| 3,767,990 | 10/1973 | Kreithen et al. | 318/573 |
| 3,932,796 | 1/1976 | Kreithen et al. | 318/685 |
| 4,446,412 | 5/1984 | Friedman et al. | 318/696 |
| 4,684,865 | 8/1987 | Auger | 318/696 |
| 4,788,484 | 11/1988 | Bolash et al. | 318/696 |
| 4,851,755 | 7/1989 | Fincher | 318/696 |
| 5,034,674 | 7/1991 | Sato | 318/696 |
| 5,216,345 | 6/1993 | Eyerly | 318/685 |
| 5,545,963 | 8/1996 | Aizawa | 318/696 |
| 5,648,710 | 7/1997 | Ikeda | 318/685 |
| 5,663,624 | 9/1997 | Callaway | 318/696 |

*Primary Examiner*—Paul Ip
*Attorney, Agent, or Firm*—John H. Crozier

[57] ABSTRACT

In a preferred embodiment, a stepper motor control, including: a driver to drive the stepper rotor; a detector to detect a commanded step rate signal provided to the driver and to provide an output signal proportional thereto; a power control, responsive to the output signal, to provide driving power to the driver, and to increase voltage to the driver in proportion to an increase in magnitude of the output signal; and an over-current protection circuit that becomes active above a predetermined motor current level and above a predetermined commanded step rate. Voltage control can be effected either on the drive board or by controlling the power supply. An additional feature provides over-current protection for the stepper motor during a lock rotor (stall) condition. The stepper motor control produces very low levels of EMI/RFI as compared with PWM current control (chopper) drives.

19 Claims, 4 Drawing Sheets

STEPPER MOTOR CONTROL

CROSS-REFERENCE TO RELATED APPLICATION

The present invention is a continuation-in-part of application Ser. No. 09/250,218, filed Feb. 13, 1999, and titled IMPROVED STEPPER MOTOR CONTROL, now abandoned.

BACKGROUND OF THE INVENTION

1. Field of the Invention

The present invention relates to stepper motor controls generally and, more particularly, but not by way of limitation, to an improved stepper motor control that increases drive voltage as step rate increases, while maintaining frame temperature of the motor relatively constant, and that produces very low levels of electromagnetic interference (EMI) and radio frequency interference (RFI).

2. Background Art

Stepper motors suffer from a well-known problem in that, as step rate increases, the impedance of the motor windings and the generated back EMF increases, causing current and performance to drop off. Some attempts to address this and related problems are discussed in the following patent documents:

U.S. Pat. No. 3,368,128, issued Feb. 6, 1968, to Parrish, and titled STEP MOTOR CONTROL CIRCUIT INCLUDING A VOLTAGE CONTROLLED OSCILLATOR, describes a closed loop stepper motor control system which allows a stepper motor "to control its own velocity and/or power according to the dictates of its load."

U.S. Pat. No. 3,424,961, issued Jan. 28, 1969, to Leenhouts, and titled LOAD RESPONSIVE, STEPPING MOTOR SPEED CONTROL CIRCUIT, describes a stepper motor control which reduces motor speed (step rate) with increasing load, which then allows for an increase in phase currents.

U.S. Pat. No. 3,444,447, issued May 13, 1969, to Newell, and titled MULTI-PHASE STEP MOTOR CONTROL CIRCUITS INCLUDING MEANS FOR SUPPLEMENTING THE NORMAL ENERGIZATION OF THE WINDINGS, describes a stepper motor control which addresses the above problem by using an energy storage technique during switched-off phase periods (unipolar motors) and a multi-phase overlapping technique.

U.S. Pat. No. 3,452,263, issued Jun. 24, 1969, to Newell, and titled STEP MOTOR DRIVE SYSTEM INCLUDING CURRENT FEEDBACK, describes a stepper motor control which uses closed loop current monitoring and a power wasting series resistor (to limit slow speed current) for unipolar motors.

U.S. Pat. No. 3,505,579, issued Apr. 7, 1970, to Leenhouts et al., and titled POWER SUPPLY FOR A STEPPING MOTOR, addresses the problem by using "an inductance means that is positioned in the A.C. part of the power circuit" to control phase currents in unipolar motors.

U.S. Pat. No. 3,662,245, issued May 9, 1972, to Newell, and titled CONTROL CIRCUIT FOR ENERGIZING THE WINDINGS OF MULTI-PHASE STEP MOTORS INCLUDING A TWO LEVEL SUPPLY VOLTAGE, describes a stepper motor control which employs a closed loop type unipolar driver which has a power wasting series, current limiting, resistor with a means of selectively bypassing it at "preselected time increments".

U.S. Pat. No. 3,665,284, issued May 23, 1972, to Loyzim, and titled POWER SUPPLY FOR A STEPPING MOTOR DEPENDENT UPON VOLTAGE LEVEL AND PULSING RATE, describes a stepper motor control which is similar to the '579 patent above, for unipolar motors, and which controls the A.C. supply for an extended speed range (3,000 to 5,000 steps/second).

U.S. Pat. No. 4,684,865, issued Aug. 4, 1987, to Auger, and titled METHOD AND DEVICE FOR CONTROLLING THE ACCELERATION OF AN ELECTRIC STEPPING MOTOR, describes a stepper motor control which uses a complex microprocessor-based system to provide the fastest acceleration and deceleration ramps for stepper motors.

U.S. Pat. No. 4,788,484, issued Nov. 29, 1988, to Bolash et al., and titled METHOD AND APPARATUS FOR DRIVING A STEPPER MOTOR WITH MULTIPLE VOLTAGES, describes a stepper motor control which is microprocessor-based and which provides two discrete voltage levels for each energy pulse supplied to a stepper motor.

U.S. Pat. No. 5,034,674, issued Jul. 23, 1991, to Sato, and titled MOTOR DRIVING VOLTAGE CONTROL DEVICE, describes a stepper motor control which employs a microprocessor-based system to provide discrete voltage levels and duration for each energy pulse to reduce battery power consumption.

U.S. Pat. No. 5,648,710, issued Jul. 15, 1997, to Ikeda, and titled SYSTEM FOR CONTROLLING DRIVE OF STEPPING MOTOR, also describes a stepper motor control which employs a microprocessor-based system which is a pulse-width-modulation (chopper) constant current type drive with features to prevent "erroneous operation".

The foregoing control systems either do not adequately address the problem, are expensive, are complicated, and/or address entirely different problems.

Accordingly, it is a principal object of the present invention to provide a stepper motor control that increases voltage to the stepper motor as the step rate increases, providing a corresponding increase in motor performance.

It is a further object of the invention to provide such a stepper motor control that increases voltage to the stepper motor while maintaining a relatively constant frame temperature rise.

It is an additional object of the invention to provide such a stepper motor control that is simple and economically implemented.

Another object of the invention is to provide such a stepper motor control that produces very low levels of EMI/RFI.

It is yet a further object of the invention to provide such a stepper motor control that can provide over-current protection of the motor windings during a locked rotor condition.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a stepper motor control, comprising: driver means to drive said stepper motor; detecting means to detect a commanded step rate signal provided to said driver means and to provide a first output signal proportional thereto; voltage control means, responsive to said first output signal, to provide driving power to said driver means, and to increase voltage to said driver means in proportion to an increase in magnitude of said first output signal to maintain constant power to said stepper motor. Voltage control can be effected either on the drive board or by controlling the power supply. An additional feature provides over-current protection for said stepper motor during a lock rotor (stall) condition. The stepper motor control produces very low levels of EMI/RFI as compared with PWM current control (chopper) drives.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
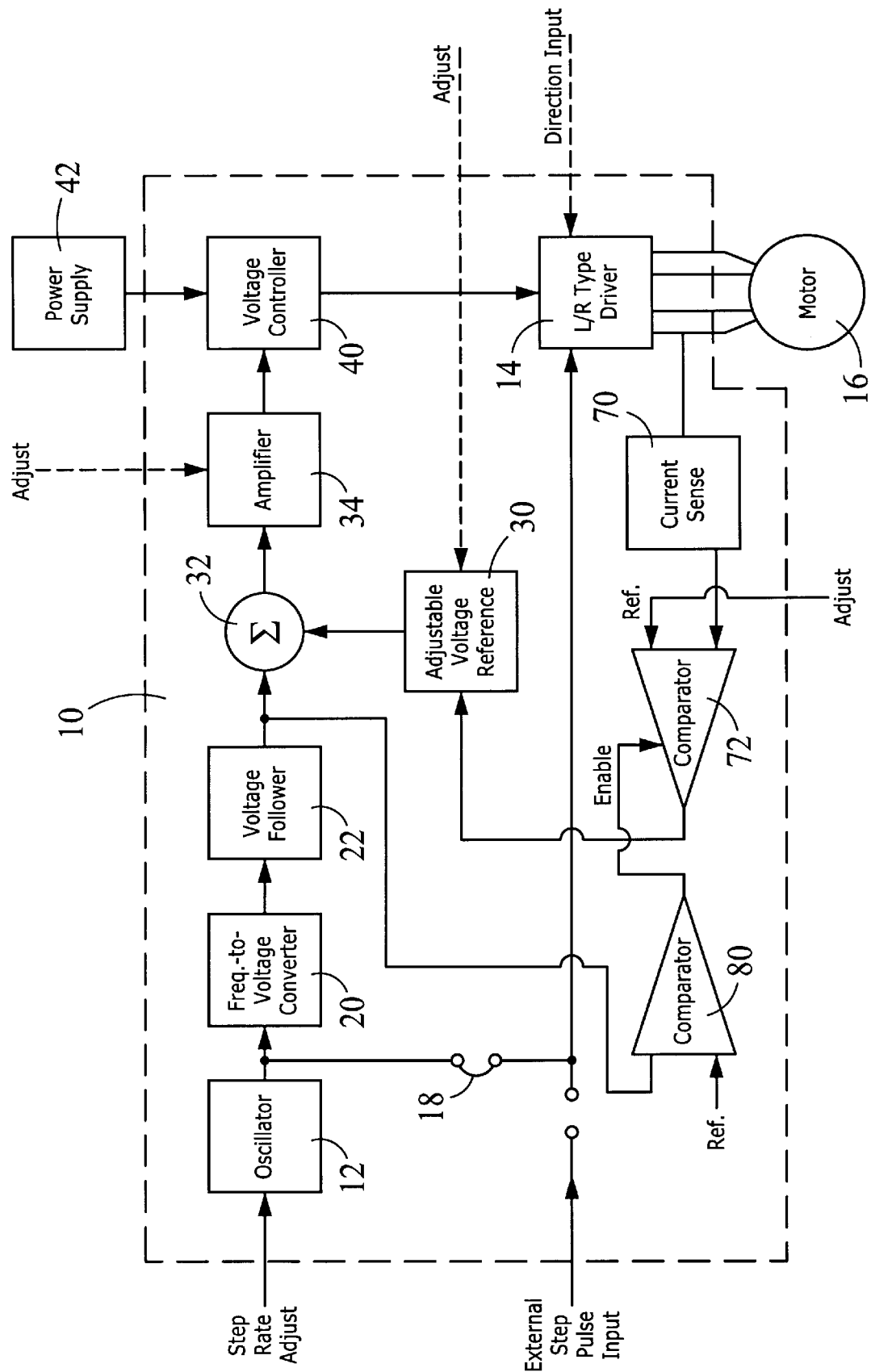
FIG. 1 is a block diagram of the major elements of a stepper motor control constructed according to one embodiment of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a stepper motor control 10 constructed according to one embodiment of the present invention. A step rate command is inputted to an oscillator 12 which outputs a pulse train which is inputted to an L/R type driver 14 which also receives a direction input and which drives a stepper motor 16 in a conventional manner. An external pulse train can be used instead of the on-board oscillator 12 by placement of a jumper 18. The pulse train from oscillator 12 is also inputted to a frequency-to-voltage converter 20 which outputs a voltage proportional to the pulse rate. A voltage follower 22 is provided at the output of frequency-to-voltage converter 20 to serve as a buffer.

The voltage signal from frequency-to-voltage converter 20 and a voltage output from an adjustable voltage reference 30 are added in a voltage summing amplifier 32 and the output of the summer is amplified in an amplifier 34. The adjustable voltage reference 30 is set depending on the desired zero-step-rate voltage for motor 16; that is, for example, whether the motor will be denominated a "5-volt" motor or a "12-volt" motor.

The output of amplifier 34 is inputted to a voltage controller 40 which connects an external power supply 42 to the driver 14. The key to a major object of the invention is setting the gain of amplifier 34 such that the voltage to motor 16 will increase as step rate increases, but that the frame temperature rise of the stepper motor will remain relatively constant. It has been found that this is easily accomplished by the trial-and-error testing of two or three data points for a particular motor type and size under consideration and measuring frame temperature rise. It is to be noted that the design procedure is required to be performed only once for each unique type or size of motor.

The entire system 10 including stepper motor 16 can operate from one single output linear power supply 42 and it will be understood that, typically, the components of system 10 will be disposed on a printed circuit, or "driver", board.

Figure 2:
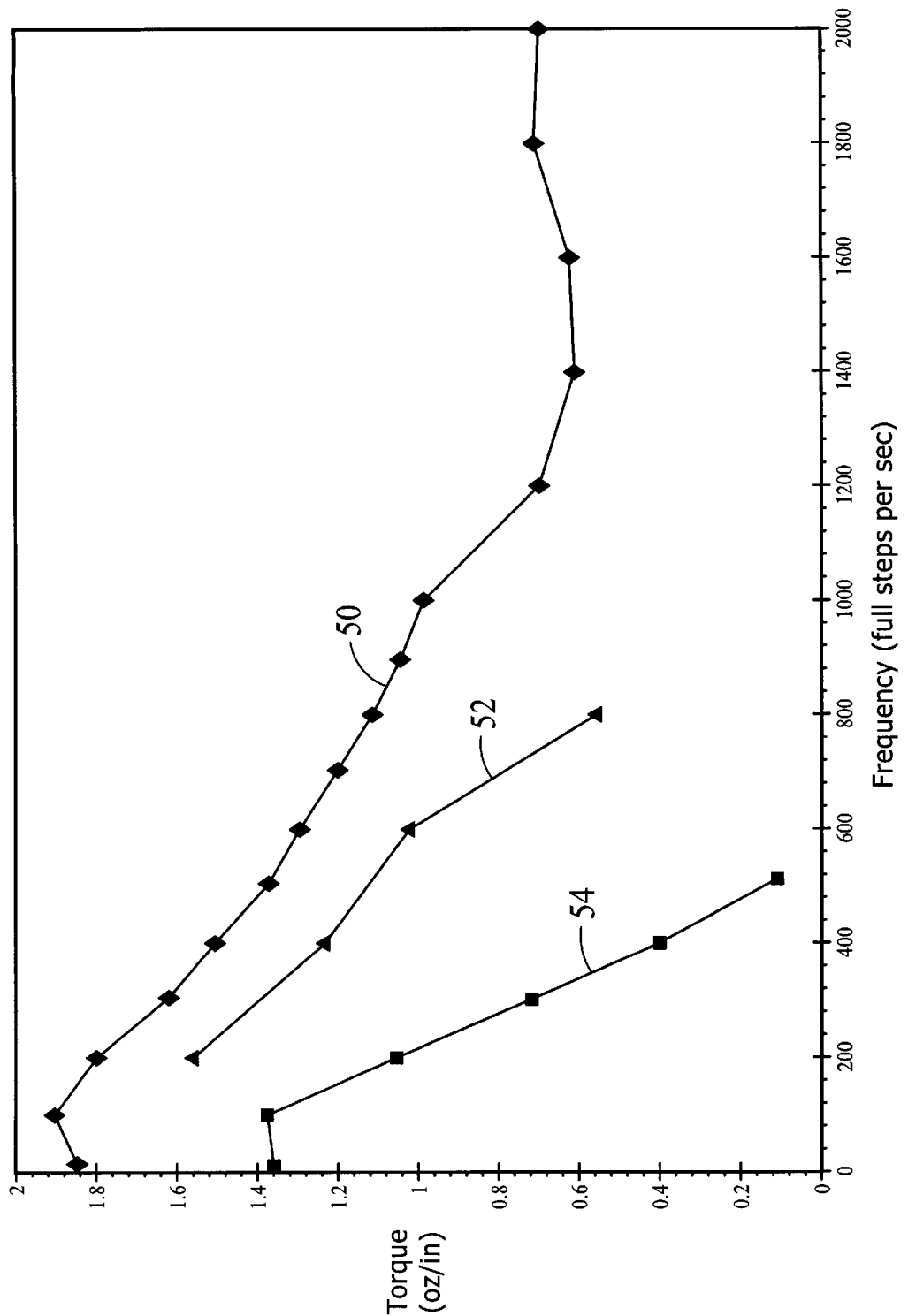
FIG. 2 is a graph of torque versus step rate for a motor driven with the stepper motor control of FIG. 1 compared with the motor controlled by conventional means.

FIG. 2 illustrates a curve 50 of torque versus step rate for a 5-volt, 1.0" can stack permanent magnet (or "tin can") stepper motor, as supplied by Haydon Switch & Instrument, Waterbury, Conn., driven by control 10 (FIG. 1), and operated at a relatively constant 75 Centigrade degree temperature rise. For comparison, there is presented a curve 52 for the same motor driven by a chopper drive at the same constant frame temperature rise and a curve 54 for the same motor driven by a conventional L/R drive at constant voltage. In the latter case, frame temperature decreases at higher step rates. The improvement in performance through the use of control 10 is evident from inspection of FIG. 2, with the motor driven by control 10 not only producing greater torque at any given step rate than the motor driven by a chopper drive or a conventional L/R drive, but the useful step rate range of the motor with the inventive drive is extended greatly beyond that of the motor using a chopper drive or a conventional L/R drive.

Figure 3:
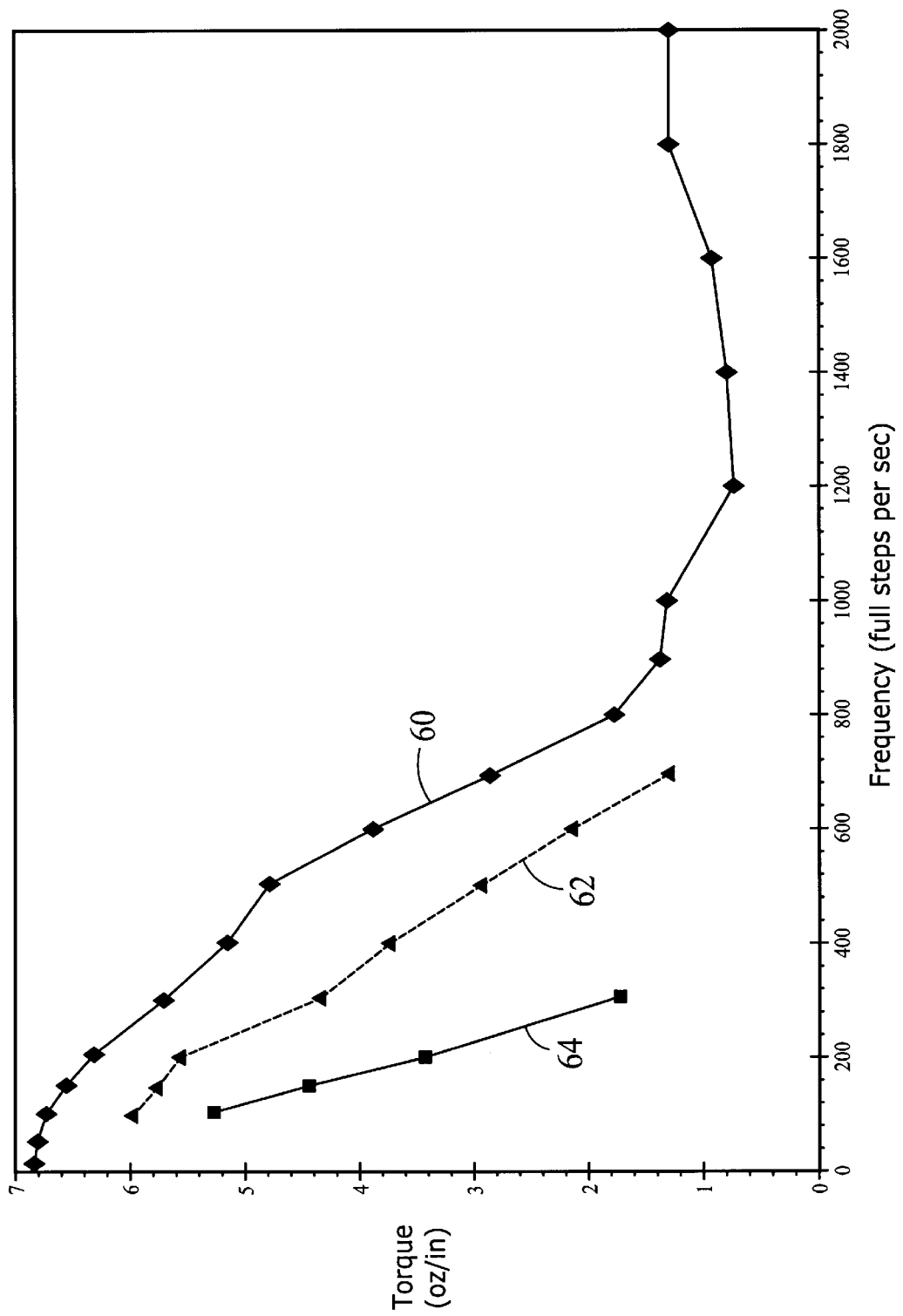
FIG. 3 is a graph of torque versus step rate for a motor driven with the stepper control of FIG. 1 compared with similar motors controlled by conventional means.

FIG. 3 illustrates a curve 60 of torque versus step rate for a 5-volt, 1.4" can stack permanent magnet (or "tin can") stepper motor, also supplied by Haydon Switch & Instrument, Waterbury, Conn., driven by control 10 (FIG. 1), and operated at a relatively constant 75 Centigrade degree temperature rise. For comparison, there is presented a curve 62 for a 3-volt motor of the same type and size driven by a chopper drive at the same constant frame temperature rise and a curve 64 for a 12-volt motor of the same type and size driven by a conventional L/R drive at constant voltage. In the latter case, as is the case with curve 54 (FIG. 2), frame temperature decreases at higher step rates. Again, the improvement in performance through the use of control 10 is evident from inspection of FIG. 3, with the motor driven by control 10 producing greater power than the motor driven by a chopper drive or a conventional L/R drive, and, again, the useful step rate range of the motor with the inventive drive is extended greatly beyond that of the motor using a chopper drive or a conventional L/R drive.

While test results have been presented for a can stack permanent magnet type of stepper motor, similar improvement in performance is achievable from the use of control 10 (FIG. 1) with hybrid stepper motors.

Referring back to FIG. 1, there is also provided an optional overcurrent safety feature to prevent dangerous overheating of motor 16 if the motor is in a locked rotor condition, in which safety feature a current sense circuit 70 measures current flow in motor 16 and outputs a voltage proportional to the current flow. This voltage is compared to a reference voltage in a first comparator 72 which outputs a disable signal to voltage reference 30, reducing the input to amplifier 34 to only the voltage proportional to step rate from frequency-to-voltage converter 20. The output of first comparator 72 could also be used to cut off power from power supply 42 or to disable the output of driver 14.

A second comparator 80 keeps the output of first comparator 72 disabled until the voltage proportional to step rate from frequency-to-voltage converter 20 exceeds a reference voltage. This allows overcurrent protection only above a set step rate. Also, an optional passive (RC) circuit can automatically cycle the enable signal to adjustable voltage reference 30 to provide "full" power (based on commanded step rate) to motor 16 for a set time period in case the overload condition on the motor has cleared. Cycle on/off times can be easily set.

Figure 4:
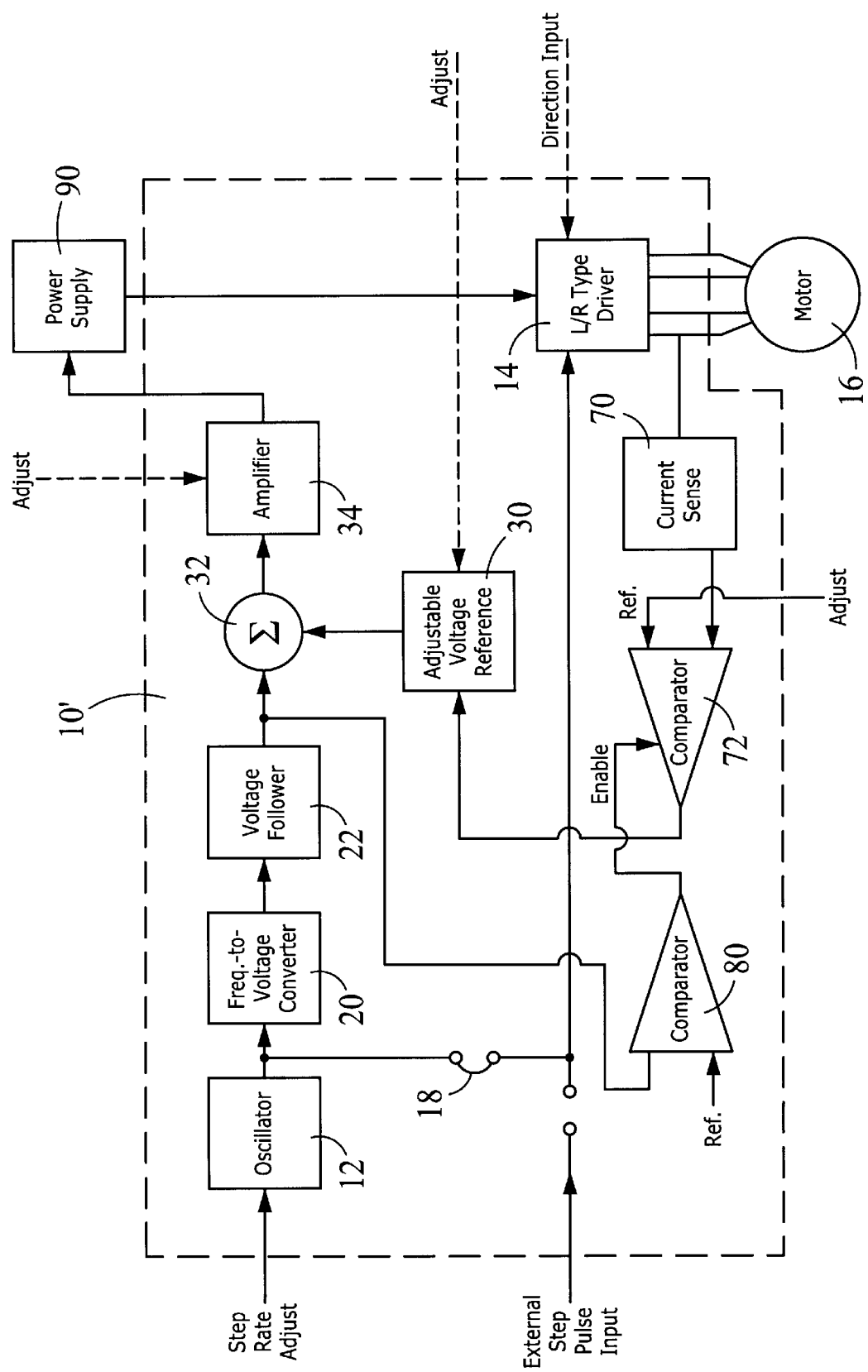
FIG. 4 is a block diagram of the major elements of a stepper motor control constructed according to another embodiment of the present invention.

FIG. 4 illustrates a stepper motor control 10' constructed according to another embodiment of the present invention. Elements of control 10' having functions similar to like elements of control 10 (FIG. 1) are given the same reference numerals as for control 10. The foregoing description of control 10 should be consulted for a discussion of those functions.

The difference between control 10' and control 10 is that, whereas control 10 included a voltage controller 40, that element has been omitted from control 10' and control of the voltage provided to driver 14 is effected by the control of power supply 90, with the output of amplifier 34 being inputted directly to the power supply. This is a somewhat more efficient arrangement than that of control 10 and there is less heat to dissipate in the driver board. Disadvantages are that two extra wires going to power supply are required and the power supply has to be modified by conventional means to accept the output from amplifier 34.

Performance of a system including control 10' can be expected to be at least as good as that shown on FIGS. 2 and 3 for systems including control 10.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A stepper motor control, comprising:
   (a) driver means to drive said stepper motor;
   (b) detecting means to detect a commanded step rate signal, derived from an on-board or an external source, provided to said driver means, and to immediately convert said commanded step rate signal to an analog output signal proportional thereto;
   (c) power control means, responsive to said analog output signal, to provide electrical driving power to said driver means, and to increase voltage to said driver means in proportion to an increase in magnitude of said analog output signal.

2. A stepper motor control, as defined in claim 1, wherein: said power control means includes a voltage controller which connects a power supply to said driver means.

3. A stepper motor control, as defined in claim 1, wherein: said power control means includes a power supply which controls said voltage in response to said analog output signal.

4. A stepper motor control, as defined in claim 1, wherein: said commanded step rate signal is derived from an on-board source.

5. A stepper motor control, as defined in claim 1, wherein: said commanded step rate signal is derived from an external source.

6. A stepper motor control, as defined in claim 1, wherein: said power control means provides drive electrical power to said driving means such that frame temperature rise of said stepper motor is relatively constant regardless of magnitude of said commanded step rate signal, within a usable speed range.

7. A stepper motor control, as defined in claim 1, further comprising: sensing means to sense current in said stepper motor and, when magnitude of said commanded step rate signal exceeds a predetermined level, to cause power to said stepper motor to be reduced if said current exceeds a predetermined level.

8. A stepper motor control, comprising:
   (a) a driver to drive said stepper motor;
   (b) an oscillator to input a variable frequency pulse train to said driver, said pulse train representing a desired step rate for said stepper motor;
   (c) a frequency-to-voltage converter with a voltage follower at its output, connected to receive said pulse train and to provide a first voltage output proportional thereto;
   (d) an adjustable voltage reference, to accommodate various motor ratings, to provide a second voltage output;
   (e) a summing amplifier connected to receive said first voltage output and said second voltage output from a voltage reference and to provide a third voltage output totalling said first voltage output and said second voltage output; and
   (f) an amplifier to amplify said third voltage output and to provide a fourth voltage output to a power control circuit, such that said power control circuit causes voltage to said stepper motor to be increased in proportion to an increase in said step rate.

9. A stepper motor control, as defined in claim 8, wherein: said power control circuit includes a voltage controller which connects a power supply to said driver.

10. A stepper motor control, as defined in claim 8, wherein: said power control circuit includes a power supply which controls said voltage in response to said fourth voltage output.

11. A stepper motor control, as defined in claim 8, wherein: gain of said amplifier is set such that frame temperature rise of said stepper motor remains relatively constant regardless of magnitude of said desired step rate, within a usable speed range.

12. A stepper motor control, as defined in claim 8, further comprising:
   (a) a current sense circuit to sense magnitude of current in said stepper motor and to provide a fifth voltage output proportional to said magnitude of current; and
   (b) a first comparator to receive said fifth voltage output and to provide an output to cause a decrease in power provided to said stepper motor if said magnitude of current exceeds a predetermined level.

13. A stepper motor control, as defined in claim 12, further comprising:
   (a) a second comparator to receive said first voltage output and to disable said first comparator if magnitude of said first voltage output is below a predetermined level.

14. A stepper motor control, comprising:
   (a) a driver to drive said stepper motor;
   (b) means to input a variable frequency pulse train to said driver from an external source, said pulse train representing a desired step rate for said stepper motor;
   (c) a frequency-to-voltage converter connected to receive said pulse train and to provide a first voltage output proportional thereto;

(d) an adjustable voltage reference, to accommodate various motor ratings, to provide a second voltage output;

(e) a summing amplifier connected to receive said first voltage output and said second voltage output from a voltage reference and to provide a third voltage output totalling said first voltage output and said second voltage output; and (f) an amplifier to amplify said third voltage output and to provide a fourth voltage output to a power control circuit, such that said power control circuit causes voltage to said stepper motor to be increased in proportion to an increase in said step rate.

15. A stepper motor control, as defined in claim 14, wherein: said power control circuit includes a voltage controller which connects a power supply to said driver.

16. A stepper motor control, as defined in claim 14, wherein: said power circuit includes a power supply which controls said voltage in response to said fourth voltage output.

17. A stepper motor control, as defined in claim 14, wherein: gain of said amplifier is set such that frame temperature rise of said stepper motor remains relatively constant regardless of magnitude of said desired step rate, within a usable speed range.

18. A stepper motor control, as defined in claim 14, further comprising:

(a) a current sense circuit to sense magnitude of current in said stepper motor and to provide a fifth voltage output proportional to said magnitude of current; and (b) a first comparator to receive said fifth voltage output and to provide an output to cause a decrease in power provided to said stepper motor if said magnitude of current exceeds a predetermined level.

19. A stepper motor control, as defined in claim 18, further comprising:

(a) a second comparator to receive said first voltage output and to disable said first comparator if magnitude of said first voltage output is below a predetermined level.

* * * * *